Patented Oct. 30, 1945

2,387,873

UNITED STATES PATENT OFFICE 2,387,873

SECONDARY DIAMINES

William Robert Boon and Arthur Reginald Lowe, Blackley, Manchester, England, assignors to Imperial Chemical Industries Limited, a corporation of Great Britain No Drawing. Application November 24, 1943, Serial No. 511,620. In Great Britain December 2, 1942

1 Claim. (Cl. 260—583)

This invention relates to the manufacture of secondary diamines.

It is known that secondary monoamines are obtainable by converting the arylidene derivatives of primary monoamines into the corresponding quaternary salts with alkyl iodides and subsequently hydrolysing these quaternary salts. The production of the secondary monoamines in this way may be represented by the following scheme, wherein R stands for an alkyl or aralkyl or aryl radical, R' stands for an alkyl radical and Ar stands for an aryl radical:

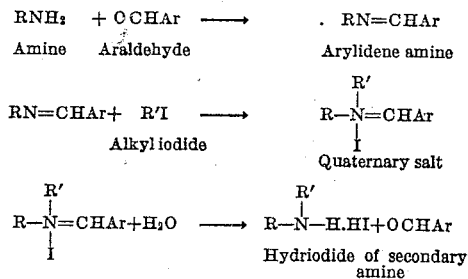

We have now found that disecondary diamines may be obtained in a similar manner, and we have also found that substantially improved yields of the disecondary diamines are obtained when dialkyl sulphates or the alkyl esters of p-toluene sulphonic acid are used in place of the alkyl iodides.

According to the present invention we provide a process for the manufacture of disecondary diamines which comprises forming quaternary salts by alkylating diarylidene derivatives of primary diamines, preferably with dialkyl sulphate or an alkyl ester of p-toluene sulphonic acid, and subsequently hydrolysing these salts.

As examples of primary diamines there may be mentioned, ethylenediamine, trimethylenediamine, tetramethylenediamine, hexamethylenediamine, decamethylenediamine, p-bis-(β-aminomethyl)benzene, p-bis-(β-aminoethyl)benzene and triglycoldiamine.

The diamines are converted into their diarylidene derivatives in the conventional manner, usually by bringing equivalent proportions of the diamine and the aldehyde into admixture with each other and, if necessary, heating. Benzaldehyde is conveniently used as the aldehyde.

The alkylation is likewise brought about in the conventional manner, usually by warming a mixture of equivalent proportions of the alkylating agents and the diarylidene derivatives until the reaction sets in. The reaction is usually strongly exothermic. Organic liquids such as ethylacetate may be included in the reaction mixture. Examples of alkylating agents include dimethyl sulphate, diethyl sulphate, methyl p-toluene sulphonate, methyl iodide and ethyl iodide.

The quaternary salts may be hydrolysed by bringing them into admixture with water or an alcohol such as ethyl alcohol and, if necessary, heating, whereupon salts of the disecondary diamines are formed. The diamines may be recovered and/or purified by conventional methods.

The disecondary diamines obtained in accordance with this invention are useful as intermediates.

The invention is illustrated but not limited by the following examples, in which the parts are expressed by weight:

Example 1

146 parts of dibenzal-hexamethylenediamine, 195 parts of methyl-p-toluene sulphonate and 9 parts of ethyl acetate are mixed together in a vessel, which is placed in a bath heated at 100° C. When the temperature of the mixture reaches 94° C., a vigorous exothermic reaction sets in. After the reaction has subsided, that is to say, when the quaternary salt has formed, the vessel is cooled and 100 parts of water are added to the mixture; the quaternary salt is hydrolysed. The ethyl acetate and the benzaldehyde formed by the hydrolysis are removed by steam distillation, the mother liquors are cooled, and 90 parts of solid caustic soda are added. The so formed N:N' - dimethyl - hexamethylenediamine is extracted with benzene and recovered by distillation. The yield is 58 parts with B. P. 112–113° C./.27 mm.

The dibenzal-hexamethylenediamine is obtained by mixing together, with stirring, equivalent quantities of hexamethylenediamine and benzaldehyde; the interaction takes place with the liberation of much heat. After standing for 2 hours the reaction mass is dissolved in ether. The ether solution is allowed to stand over calcium chloride to remove the water formed in the reaction; it is then filtered from the calcium chloride and cooled strongly. Dibenzalhexamethylenediamine separates in the form of a pale yellow, low melting crystalline mass. The compound may be further purified by recrystallisation from petrol ether (B. P. 40–60° C.); it has M. P. 32° C.

Example 2

146 parts of dibenzal-hexamethylenediamine, 114 parts of dimethyl sulphate and 4.5 parts of ethyl acetate are mixed together with stirring. A vigorous reaction sets in, and the quaternary salt is formed. After standing, the quaternary salt is hydrolysed with water and the N:N'-dimethyl-hexamethylenediamine is recovered in the manner described in Example 1. 46 parts are obtained.

*Example 3*

146 parts of dibenzal-hexamethylenediamine and 142 parts of methyl iodide are mixed together in a vessel which is heated on a hot plate at 40° C. for 18 hours. 130 parts of ethyl alcohol are added to the so formed quaternary salt, and the mixture is heated at 100° C. for 8 hours. The so obtained solution is cooled in ice, whereupon the N:N'-dimethyl-hexamethylenediamine dihydriodide separates in the form of yellowish brown crystals. The crystals are collected by filtration, washed with ether, basified with caustic soda, and the N:N'-dimethylhexamethylenediamine is recovered in the manner described in Example 1. 39.5 parts are obtained.

*Example 4*

170 parts of p-bis($\beta$-benzalaminoethyl)-benzene, 114 parts of dimethyl sulphate and 9 parts of ethyl acetate are mixed together and warmed gently. When the temperature reaches 60° C. a vigorous exothermic reaction sets in, and the quaternary salt is formed. The quaternary salt is hydrolysed with water and the p-bis-($\beta$-methylamino-ethyl)-benzene is recovered in the manner described in Example 1. 60 parts are obtained with B. P. 172° C./20 mm.

The p-bis-($\beta$-benzalaminoethyl)-benzene is obtained by mixing together with stirring 33 parts of p-bis-($\beta$-aminoethyl)-benzene and 42.4 parts of benzaldehyde. Much heat is developed and there is an immediate separation of the p-bis-($\beta$-benzalaminoethyl)-benzene in a crystalline form. The crystalline material is washed with a little ether, and then dried in air. The yield is theoretical and the M. P. of the material is 111–112° C.

We claim:

Process for the manufacture of N,N'-dimethylhexamethylenediamine which comprises heating approximately 146 parts of N,N'-dibenzalhexamethylenediamine with approximately 195 parts of methyl p-toluenesulfonate to approximately 94° C., cooling the reaction mixture after the vigorous exothermic reaction has subsided, adding approximately 100 parts of water to the reaction mixture, removing benzaldehyde by steam distillation, adding approximately 90 parts of solid caustic soda and removing the so-formed N,N'-dimethylhexamethylenediamine by extraction with benzene and distillation.

WILLIAM ROBERT BOON.
ARTHUR REGINALD LOWE.